United States Patent [19]
Bluem

[11] 3,866,563
[45] Feb. 18, 1975

[54] OPTICAL READOUT APPARATUS

[76] Inventor: Gary R. Bluem, 7980 Wynnwood Rd., Minneapolis, Minn. 55427

[22] Filed: June 4, 1973

[21] Appl. No.: 366,682

[52] U.S. Cl................ 116/34 R, 73/146.8, 350/116
[51] Int. Cl............................................. B60c 23/04
[58] Field of Search............... 73/146.8, 146.3, 419; 137/227, 228; 116/34 R; 350/243, 244, 116, 191

[56] References Cited
UNITED STATES PATENTS

| | | | |
|---|---|---|---|
| 2,565,140 | 8/1951 | Leustig | 350/116 |
| 2,896,566 | 7/1959 | Laurie, Sr. et al. | 116/34 R |
| 2,903,888 | 9/1959 | Gföll | 73/146.8 |
| 3,177,724 | 4/1965 | Trinca | 73/146.8 |
| 3,762,799 | 10/1973 | Shapiro | 350/191 |

*Primary Examiner*—Donald O. Woodiel

[57] ABSTRACT

An air pressure testing apparatus connected to a conventional valve stem of a pneumatic tire is operable to provide visual color information as to the pressure of the air in the tire. The apparatus has a body mounted on the valve stem. A transparent housing having circumferential beads is mounted on the body. A spring biased annular piston located between the housing and body has color code information. Separate colors on the piston are visually observable through the beads as determined by the longitudinal position of the piston relative to the beads. An elongated plunger extended through the body is movable to open the valve in the valve stem to subject the annular piston to the air pressure of the tire. If the air pressure is above a predetermined pressure, the piston will move changing the color code observable through the beads. If the air pressure is below the predetermined pressure, the piston will not move and the color code will remain the same. The plunger is movable to a position wherein air under pressure can be introduced into the tire.

13 Claims, 8 Drawing Figures

PATENTED FEB 18 1975

OPTICAL READOUT APPARATUS

BACKGROUND OF THE INVENTION

Richards in 1898 disclosed in U.S. Pat. No. 602,242 an air pressure indicator attached to the valve stem of a bicycle tire in a manner to indicate the pressure of the air in the tire. Numerous tire pressure indicators since Richards have been developed with the extensive use of pneumatic tires on vehicles. Examples of recent tire pressure indicators are described in U.S. Pat. Nos. 3,224,264; 3,536,026 and 3,719,198. These air pressure indicators are relatively complex in structure which leads to inaccurate or no readings. The air pressure apparatus of this invention obviates the disadvantages of the prior air testing devices for pneumatic tires.

SUMMARY OF THE INVENTION

The invention is broadly related to a fluid pressure testing apparatus or pressure indicating device for indicating whether the fluid pressure in a container is above or below a selected value. More particularly, the pressure testing apparatus is an air pressure testing apparatus for pneumatic tires as used on land and air vehicles, including but not limited to automobiles, trucks, recreational vehicles, bicycles, motorcycles, trailers, airplanes, tractors, and the like.

The testing apparatus has a body means which is mountable on the valve stem of a tire. The body means has a passage in communication with the passage of the valve stem. A transparent housing means surrounds the body means and forms with the body means an annular chamber. An annular piston means is located in the annular chamber. The piston means carries a first information means and a second information means which are selectively visible through the housing means, as determined by the position of the piston means in the chamber. The information means can be color codes. The piston means is biased with biasing means to a first position wherein the first information means is visually observable through the housing means. The piston will remain in this position until it is subjected to air pressure that is greater than the biasing force of the biasing means. A plunger extends through the passage in the body. The plunger is normally spaced from the air valve rod or valve core so that it does not interfere with the normal operation of the air valve in the valve stem. The plunger is movable to a position to engage the air valve rod and open the air valve whereby air under pressure from the tire acts on the annular piston. When the air pressure is greater than the biasing force of the spring, the annular piston will move to a second position wherein the second information means is visually observable through the transparent housing means. The change in the information means provides visual information that the air pressure in the tire is greater than the biasing force acting on the annular piston. The plunger is movable to a second position wherein air from an air hose can be introduced directly into the tire. The plunger makes contact with the air valve rod and opens the air valve wherein the air is free to flow through the passage and the valve stem into the tire. The pressure of the air in the tire can be checked with a conventional gauge. The gauge engages the head end of the plunger, moving the plunger to its full "in" position. This opens the passage in the body means and opens the air valve in the stem. The air pressure in the tire can be read on the pressure gauge.

An object of the invention is to provide an air pressure testing apparatus for a pneumatic tire that is normally in a passive condition wherein it does not interfere with the normal closing action of the air valve in a valve stem. A further object of the invention is to provide an air pressure testing apparatus which can be easily actuated to provide visual indication of whether the air pressure in a tire is above or below a predetermined value. Another object of the invention is to provide an air pressure testing apparatus that is self-cleaning in use. Yet another object of the invention is to provide an air pressure testing apparatus for a pneumatic tire that is integral with the valve stem for the tire. A further object of the invention is to provide an air pressure testing apparatus which is simple and sturdy in construction, attractive in appearance, easily installed on a conventional valve stem and reliable and safe in use.

IN THE DRAWINGS

Figure 1:
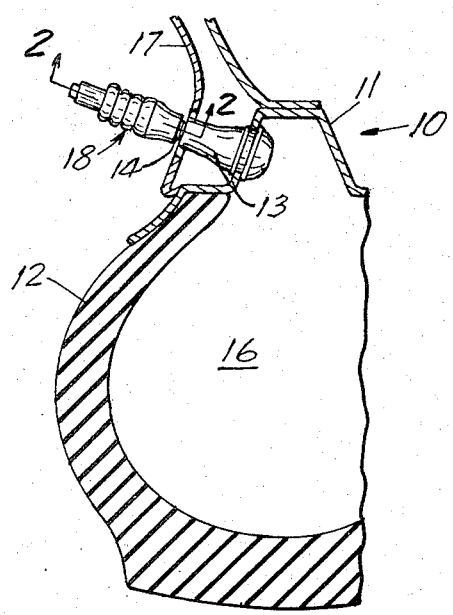
FIG. 1 is a fragmentary sectional view through a vehicle wheel showing the air pressure tester of the invention on the valve stem of the pneumatic tire.

Referring to the drawings, there is shown in FIG. 1 a vehicle wheel indicated generally at 10 as used on conventional automobiles, motor homes, trucks, trailer, tractors, and like vehicles. Other types of pneumatic tires, as used on bicycles, aircraft, industrial and agricultural machinery, can be equipped with the air pressure testing apparatus of the invention. Wheel 10 has a rim 11 carrying a pneumatic tire 12. Rim 11 has a hole accommodating a valve stem 13. Stem 13 has the conventional valving element to block the flow of air through the valve stem from the chamber 16 of the tire 12. Valve stem 13 extends through a hole in the wheel cover 17. Valve stem 13 projects outwardly at an upward angle as determined by the shape of rim 11. The shapes of different types of rims vary so that the angles of the valve stems vary. For example, the valve stem can project in a generally radially inward direction.

Mounted on the outer threaded end 14 of valve stem 13 is an air pressure testing apparatus of the invention indicated generally at 18. Pressure testing apparatus 18 is operable to provide visual information as to whether the air pressure in chamber 16 is above or below a selected pressure. Testing apparatus 18 also permits the introduction of air under pressure into chamber 16 through the valve stem 13 and the checking of the air pressure in chamber 16 with a conventional tire air pressure gauge.

Testing apparatus 18 is hereinafter described as a device to test air pressure in a pneumatic tire. The testing apparatus 18 can be used to test the pressure of other fluids stored in containers or vessels.

Figure 2:
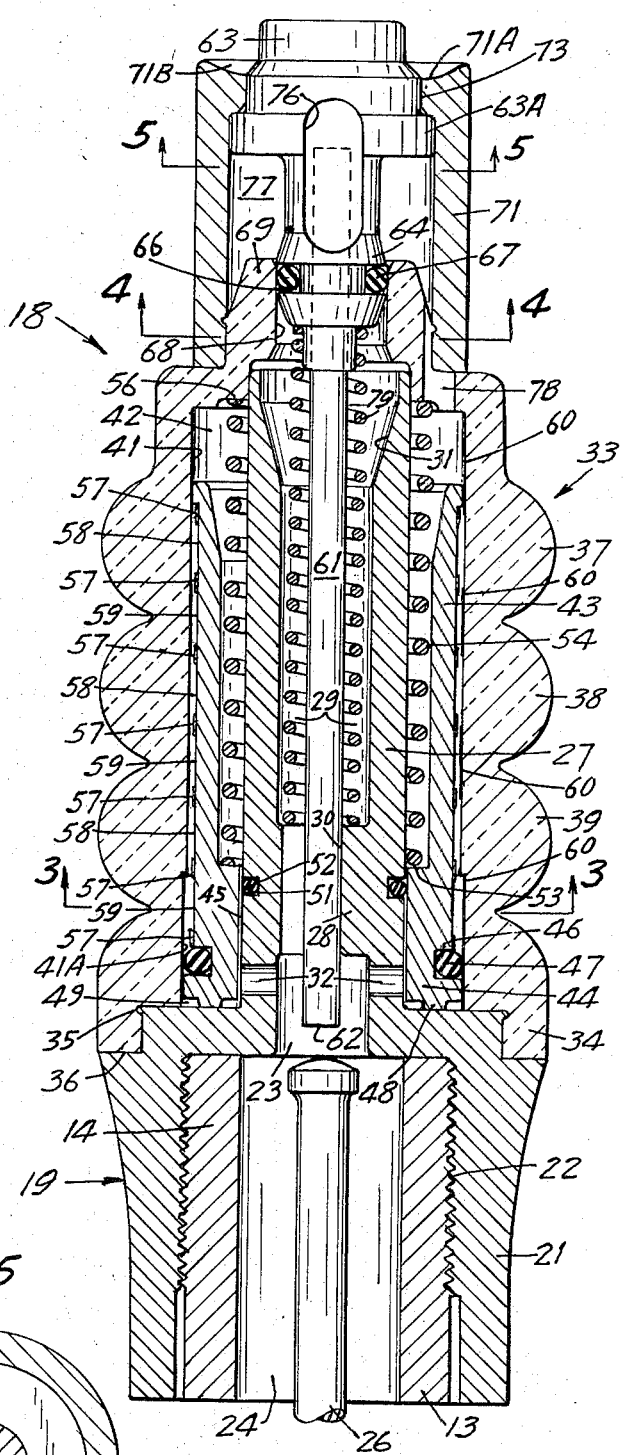
FIG. 2 is an enlarged sectional view taken along the line 2—2 of FIG. 1 showing the air pressure tester in the passive condition.

As shown in FIG. 2, testing apparatus 18 has a body indicated generally at 19 attached to the outer threaded end 14 of the valve stem 13. The body 19 has a cylindrical head 21. The inside wall of head 21 has threads 22 coacting with the threads on the threaded end 14 to mount the body 19 on the valve stem 13. The head 21 can be integral with valve stem 13. The apparatus 18 is mountable on the conventional valve stem without interfering with the normal closed position of the air valve in the valve stem. The center portion of head 21 has a central hole 23 in communication with the passage 24 of the valve stem 13. Conventional air valve rod or valve core stem 26 is located in passage 24 and is connected to the valving element or air valve (not shown). Valve rod 26 operates in the conventional manner in that when the rod 26 is depressed or moved into the passage 24, the air valve is opened thereby providing fluid communication to the interior or chamber 16 of the tire 12.

Figure 3:
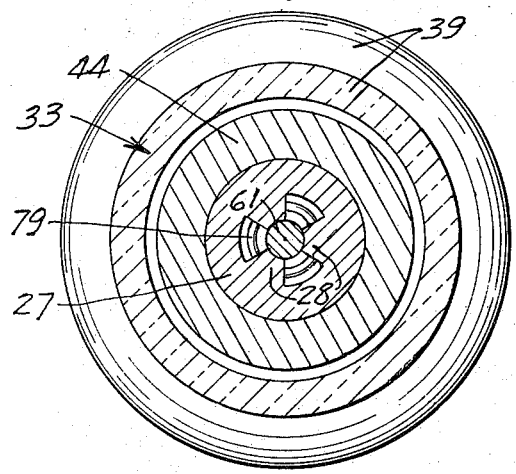
FIG. 3 is a sectional view taken along the line 3—3 of FIG. 2.
Figure 4:
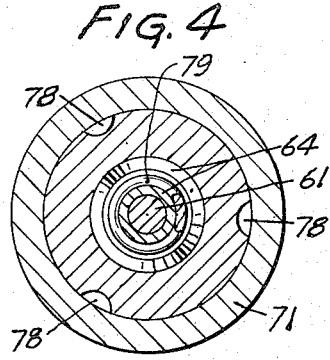
FIG. 4 is a sectional view taken along the line 4—4 of FIG. 2.
Figure 5:
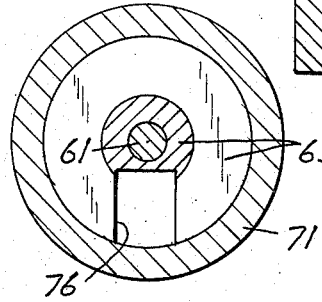
FIG. 5 is a sectional view taken along the line 5—5 of FIG. 2.

Body 19 has an elongated tubular trunk 27 integral with the head 21 and extended in a longitudinal direction outwardly away from head 21. As shown in FIGS. 2 and 3, trunk 27 has a plurality of inwardly directed legs 28. The ends of the legs 28 are spaced from each other to provide an opening 30 in axial alignment with the valve rod 26. The legs 28 are circumferentially spaced from each other to provide a passage 29 in communication with the center hole 23. Passage 29 extends axially through the trunk 27.

The upper or outer end of trunk 27 has an outwardly tapered recess 31 which increases the size of the passage 29. The opposite end of trunk 27 has transverse or lateral ports or outlet passages 32 which permit the flow of air externally of the trunk 27.

A sleeve-like housing indicated generally at 33 is concentrically disposed about the trunk 27. Housing 33 has an annular flange 34 disposed in an annular step shoulder 36 in the base portion of head 21. The flange 34 and head 21 have cooperating groove and rib means 35 which fix the housing 33 on the head 21. Suitable adhesives or bonding materials can be used to attach the housing 33 to head 21. The housing 33 has three circumferential transparent beads 37, 38 and 39. Each bead has an annular shape and a semicircular longitudinal sectional configuration and functions as a lens structure which focuses the light in an inward direction. The transparent beads 37, 38 and 39 function as an optical system to enlarge the visual image of the air pressure information indicia within housing 33. The housing 33 has an inside cylindrical wall 41 spaced from the trunk 27 thereby providing an annular chamber 42. Housing 33 is made of a transparent material, as a transparent plastic, glass, or the like.

An elongated annular piston or sleeve member 43 is movably disposed in chamber 42. Piston 43 has a base portion 44. An annular groove 46 is disposed in the bottom of the outside wall of base 44. An O-ring 47 is located in groove 46 and in engagement with a portion 41A of the inside wall 41. Air under pressure in groove 46 moves the O-ring 47 in sealing engagement with base portion 44 and wall 41A. The base 44 has axially extended projections or feet 48 in engagement with the bottom of head 21. The feet 48 are circumferentially spaced from each other to provide passages 49 in communication with the outlet passages 32. The inside wall 45 of base 44 is in engagement with a second O-ring 51. O-ring 51 is disposed in an annular groove 52 located in the trunk 27. The O-rings 47 and 51 provide seals internally and externally of the annular piston 43 whereby air under pressure from tire 12 acts on the piston 43 to move the piston 43 longitudinally away from head 21.

Piston 43 is biased into engagement with head 21 with a calibrated compression spring 54. Spring 54 is calibrated in accordance with the air pressure level which is to be tested in the tire. One end of spring 54 engages an annular shoulder or step 53 on the base 44. The opposite end of the spring 54 is disposed in an annular recess 56 in the outer end of housing 33.

A plurality of longitudinally spaced circumferential black lines 57 are mounted on the outer circumference of the piston 43. Lines 57 divide the outside wall of the piston into a plurality of circumferential information segments or bands 58 and 59. The segments 58 are color coded red and are in transverse alignment with the diametrical axes of the beads 37, 38 and 39 when the piston 43 is in engagement with the head 21, as shown in FIG. 2. When the piston 43 is in this position, the testing apparatus 18 will provide a red visual indication. The segments or bands 59 are color coded green and are located between the red segments 58. The color green is not visible when the piston 43 is in engagement with the head 21 because of the lens structure of the beads 37, 38 and 39. The bands 58 and 59 are color coded red and green, respectively. Other color code combinations and other information indicia, as numbers, marks, grooves, braille, and the like, can be used to identify the bands.

The inside wall 41 of housing 33 has a plurality of cylindrical strips or masks 60 of opaque material, as black ink or paint. Strips 60 are located adjacent bands 59 and the opposite ends of piston 43 and are longitudinally separated from each other providing annular transparent sections aligned with bands 58 whereby the color information of bands 58 is visible and the color information of bands 59 is masked or covered.

A linear plunger 61 extends longitudinally through the passage 29 of the trunk 27. The plunger 61 slideably projects through opening 30 and has a forward end 62 located in the center hole 23. End 62 is normally spaced from air valve rod 26. The opposite or rear end of plunger 61 has a head 63 which serves as an actuator button for the pressure testing apparatus. An annular collar 64 is mounted on the plunger 61 adjacent the head 63. Collar 64 has an annular groove 66 accommodating an O-ring 67. O-ring 67 is in sealing engagement with the cylindrical inside wall 68 of the nipple or projection 69 on the outer end of housing 33. The collar 64 and O-ring 67 function as a seal to close the opening from the inside of housing 33 and passage 29.

A cylindrical cap 71 is located about the head 63. The cap 71 is mounted on the nipple 69 and has a groove 72 accommodating a rib or projection to fix the position of the cap on the nipple. Other types of fastening or holding structure can be used to mount the cap on the nipple. The cap 71 has a center hole or opening 73 for a portion of the head 23. The head 63 has an outwardly directed annular flange or chin 63A which engages short annular and inwardly directed portion 71A of the head 63 surrounding opening 73 to limit outward movement of the head relative to the cap 71. The top part of cap portion 71A has an inwardly inclined wall 71B to accommodate a conventional air chuck used to introduce air into the tire via the testing apparatus. The flange 63A has a longitudinal groove or opening 76 providing a passage from the chamber 77 within cap 71 to the atmosphere. Housing 33 has three passages 78 providing fluid communication between chamber 77 and the chamber 42 of housing 33. Thus the air in the chamber 42 is vented to the atmosphere via passages 78 and opening 76.

The plunger 61 is biased in an outward direction with a compression spring 79. Spring 79 is concentrically positioned about plunger 61. One end of spring 79 engages the legs 28 of trunk 27. The outer end of spring 79 engages the base of collar 64.

Figure 8:
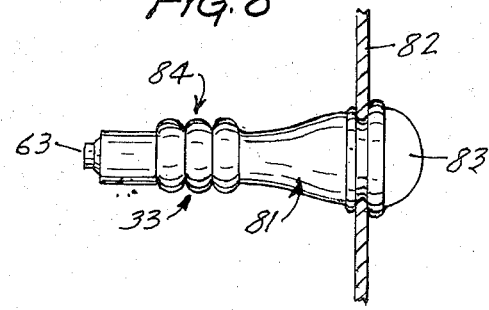
FIG. 8 is a modification of the air pressure tester of the invention mounted on the rim of a vehicle wheel.

Referring fo FIG. 8, there is shown a modification of the fluid pressure testing apparatus of the invention integral with a valve stem 81. Stem 81 is mounted on the rim 82 of a tire as a pneumatic tire of a motor vehicle or the like. Valve stem 81 has a base 83 cooperating with the rim 82 to mount the stem on the rim. The outer end of valve stem 81 has air pressure testing apparatus indicated generally at 84. Testing apparatus 84 is identical in structure with the testing apparatus 18 as shown in FIG. 2. The body of apparatus 84 is integral with the valve stem 81.

In use, the pressure testing apparatus 18 as shown in FIG. 2 is in the passive condition. The valving element in the valve stem 13 functions to prevent the escape of air from the chamber 16 of the tire. The testing apparatus 18 does not interfere with the normal operation of the air valve. The annular piston 43 is biased with spring 54 into engagement with the base of the head 21. This locates the red segments or bands 58 in alignment with a transverse plane passing through the mid portion of the beads 37, 38 and 39. The annular convex shape of the beads 37, 38 and 39 focus the light on the red bands 58 whereby a red visual indication is expressed by the testing apparatus.

Figure 6:
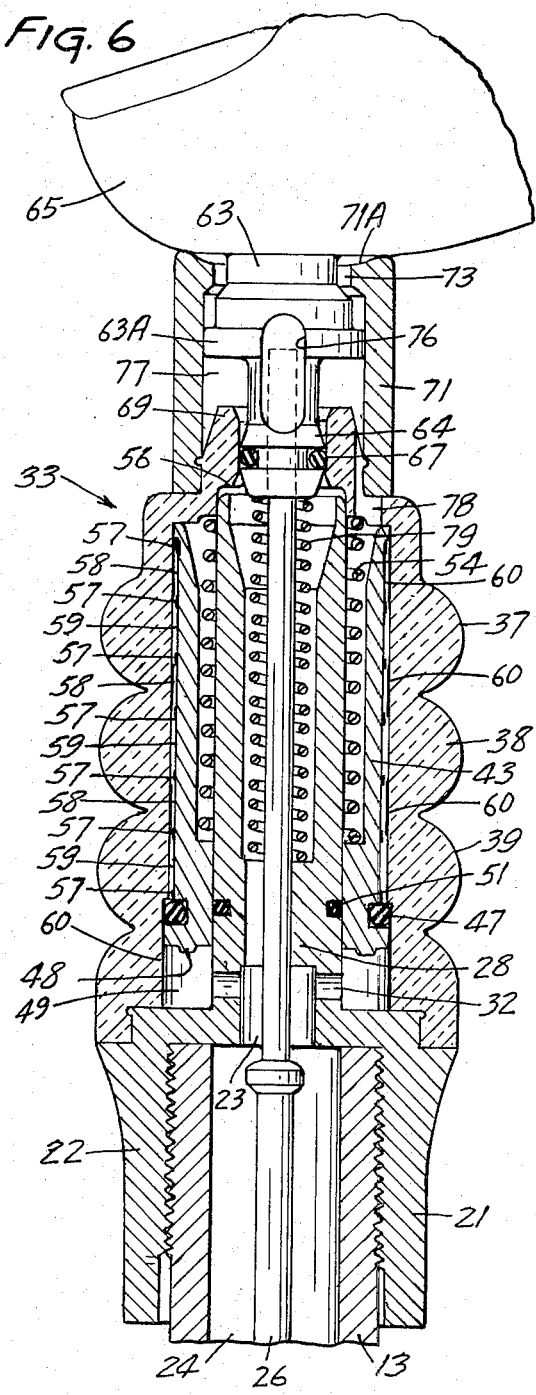
FIG. 6 is a sectional view of the air pressure tester similar to FIG. 5 showing the tester in the test condition.

Referring to FIG. 6, the testing apparatus 18 is shown in the test condition. Pressure, such as the pressure of a finger 65 on the head 63 moves the head and plunger 61 from its passive or first position in an inward direction. Head 63 is moved into cap 71 until finger 65 contacts the top cap portion 71A. Portion 71A serves as a stop determining the test or second position of the plunger 61. The end 62 engages the air valve rod 26 moving the air valve rod 26 in an inward or open position opening the air valve. The air under pressure in the tire chamber 16 flows through the valve stem 13 into the passage 29. The collar 64 and O-ring 67 confine the air to the passage 29. The air flows through lateral ports 32 under the piston 43. If the pressure of the air is above a predetermined value as determined by the compression characteristics of spring 54, the piston 43 will move in an upward or outward direction and engage the top of housing 33. This moves the green bands 59 into registration with the transverse planes and longitudinal alignment with the beads 37, 38 and 39. The testing apparatus 18 will now visually indicate a green color providing information that the pressure in the tire is equal to or above a predetermined pressure. This pressure is dependent upon the compression characteristics of the calibrated spring 54. The calibration number of the spring 54 is identified directly on the cap 71.

When piston 43 moves from its first or passive position, shown in FIG. 1, to the test or second position, shown in FIG. 2, the air above the piston is forced through openings 78 into chamber 77. Air in chamber 77 flows past head 63 carrying any foreign particles, as dirt, snow and the like, to the atmosphere. Thus, every time the head 63 is depressed and the piston 43 moves to the test position, the apparatus is self-cleaned or purged with escaping air.

When the actuating pressure on head 63 has been released, the spring 79 will bias the head back into its initial position as shown in FIG. 2. This will move the end 62 of the plunger 61 away from the valve rod 26 whereby the air valve will close cutting off the pressure of the air to the testing apparatus. The air pressure in the passage 29 is reduced due to the increase in volume of passage 79. As soon as the pressure is below a predetermined value, the spring 54 will bias the piston 43 back to its initial position as shown in FIG. 2. This places the red bands in transverse registration with the beads 37, 38 and 39. The indicator will now read its red condition.

Figure 7:
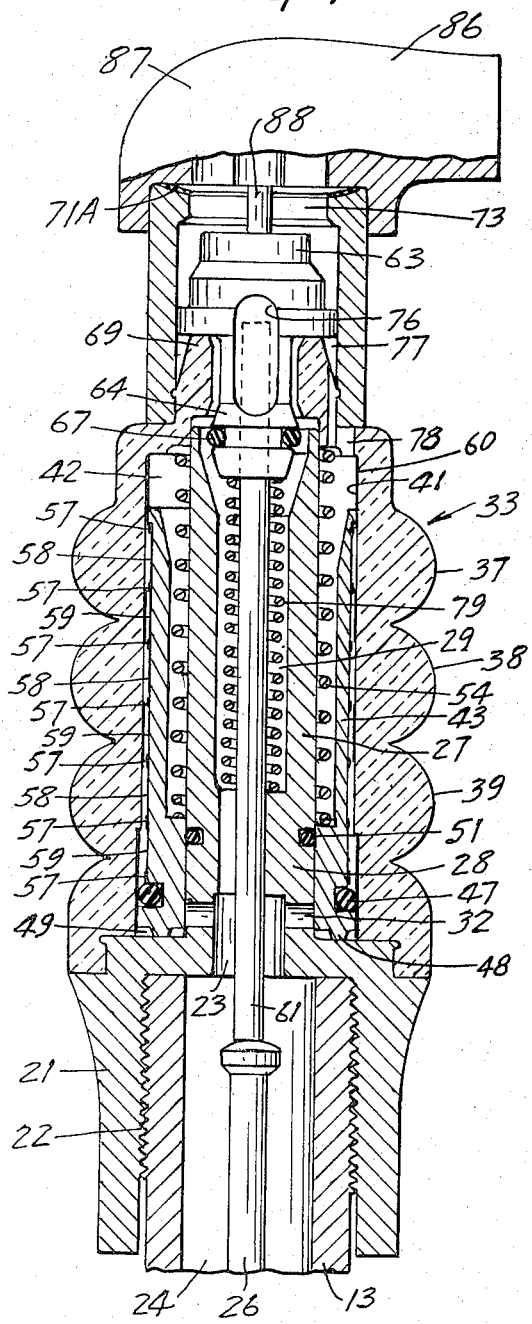
FIG. 7 is a sectional view of the air pressure tester similar to FIG. 2 showing the tester in the air fill condition.

Referring to FIG. 7, the pressure testing apparatus 18 is shown in the "fill" position. Air under pressure from a conventional hose indicated at 86 is placed over the outer end of cap 71. The hose coupler or chuck 87 has a central finger 88 which engages the head 63. The finger moves the head 63 into the chamber 77. The collar 64 and O-ring 67 will be moved into the enlarged area of the trunk 27 and contact the top end of nipple 69. This moves the O-ring 67 out of sealing engagement with the cylindrical wall 68. The air is free to flow through the passage of the nipple 69 into the passage 29. The passage 29 leads to the center hole 23 in communication with the valve passage 24. The plunger 61 will move the air valve rod 26 to its in or open position whereby the air from the hose 86 can flow through the testing apparatus 18 into the chamber 16 of tire 12.

A conventional tire pressure gauge can be used to check the pressure of the tire. The gauge functions in the same manner as hose 86 to move the plunger to its full in position whereby the pressure of the tire flows through the pressure testing apparatus 18 to provide the indication of the tire pressure on the gauge. Upon removal of the gauge from the head 63, the spring 79 will bias the plunger 61 to its passive position, as shown in FIG. 2. The air valve rod 26 will return to its closed position thereby confining the air to the chamber 16 of tire 12.

While there have been shown and described preferred embodiments of the invention, it is understood that various changes, substitutions of parts and materials may be made by those skilled in the art without departing from the spirit of the invention.

The embodiments of the invention in which an exclusive property or privilege is claimed are defined as follows:

1. An optical read out apparatus to provide visual information as to the existence of a condition comprising: first means having a viewing section, second means movable relative to and adjacent the viewing section in response to a condition, said second means having information means indicating the condition, said viewing section including a transparent section having at least one annular outwardly divided bead, said bead providing an optical structure for viewing the information means when the information is located adjacent the transparent section.

2. The apparatus of claim 1 wherein: the transparent section has a plurality of side-by-side annular outwardly directed beads providing optical structure for viewing the information means.

3. The apparatus of claim 1 wherein: the first means is a generally cylindrical member, and the second means is a sleeve located within the cylindrical member and movable relative thereto.

4. The apparatus of claim 3 including: means to bias the sleeve to a position wherein the information means does not indicate the condition.

5. The apparatus of claim 1 wherein: the second means has first information means indicating the condition and second information means indicating the non-existence of the condition.

6. The apparatus of claim 5 wherein: the first and second information means are contrasting colored bands.

7. An optical readout apparatus to provide information as to the existence of a condition comprising: a first cylindrical means having a viewing section, said viewing section having a plurality of axially spaced annular outwardly directed bead means, said bead means providing optical structures for viewing the area on the inside of said cylindrical means, and second cylindrical means concentrically positioned within the first cylindrical means and movable relative to the viewing section in response to a condition, said second means having information indicating the condition, and means to move the second means relative to the first means to a position wherein the information means does not indicate the condition.

8. The apparatus of claim 7 wherein: the second means has first information means indicating the condition and second information means indicating the non-existence of the condition.

9. The apparatus of claim 8 wherein: the first and second information means are contrasting colored bands.

10. The apparatus of claim 7 wherein: the means to move the second means includes biasing means to bias the second means to a first position relative to the first means to indicate the non-existence of the condition.

11. The apparatus of claim 7 wherein: the second means is a fluid pressure actuated piston.

12. The apparatus of claim 7 wherein: the viewing section has three circumferential beads, said beads located in side-by-side longitudinal position along the first cylindrical means.

13. The apparatus of claim 7 wherein: the information means comprises a first means being a colored band transversely aligned with said beads when the piston is in a first position and second means being a colored band transversely aligned with said beads when the piston is in a second position.

* * * * *